United States Patent [19]

Anderson et al.

[11] 4,413,015

[45] Nov. 1, 1983

[54] STORAGE STABLE WATER-DILUTABLE ACID ADDUCTED EPOXY BASED COATING FOR METAL FOOD CONTACT SURFACES

[75] Inventors: Ronald W. Anderson, Allison Park; Richard A. Lamanna, McMurray, both of Pa.

[73] Assignee: Mobil Oil Corporation, New York, N.Y.

[21] Appl. No.: 262,088

[22] Filed: May 11, 1981

Related U.S. Application Data

[63] Continuation-in-part of Ser. No. 50,722, Jun. 21, 1979, abandoned, which is a continuation-in-part of Ser. No. 828,584, Aug. 29, 1977, abandoned.

[51] Int. Cl.$^3$ ............................................ A21D 10/02
[52] U.S. Cl. .................................. 426/131; 215/1 C; 426/106; 426/398; 428/35; 428/418; 428/413; 523/456; 523/402; 528/104; 528/111.5; 528/115
[58] Field of Search ................... 260/19 EP; 428/418, 428/35; 528/104, 111.5, 115; 523/456, 402; 415/1 C; 426/131, 106, 398

[56] References Cited

U.S. PATENT DOCUMENTS

| | | | |
|---|---|---|---|
| 3,351,574 | 11/1967 | Hicks et al. | 260/18 EP |
| 3,355,401 | 11/1967 | Tanner | 260/29.2 EP |
| 3,413,248 | 11/1968 | Kraft et al. | 260/18 EP |
| 3,661,818 | 5/1972 | Güldenpfennig | 260/19 EP |
| 3,720,648 | 3/1973 | Güldenpfennig | 260/19 EP |
| 3,840,483 | 10/1974 | Güldenpfennig | 260/19 EP |
| 3,888,808 | 6/1975 | Downs et al. | 260/18 EP |
| 4,098,735 | 7/1978 | Tobias | 528/111.5 |
| 4,105,614 | 8/1978 | Davis et al. | 523/456 |
| 4,151,305 | 4/1979 | Davis et al. | 528/104 |

*Primary Examiner*—George F. Lesmes
*Assistant Examiner*—E. Rollins Buffalow
*Attorney, Agent, or Firm*—Charles A. Huggett; Michael G. Gilman; Edward J. Trojnar

[57] ABSTRACT

A resin is provided which is the adduct of a monocarboxylic acid and a diglycidyl ether of a bisphenol, or of a monocarboxylic acid, a bisphenol, and a diglycidyl ether of a bisphenol, reacted with an anhydride to an Acid No. of 35 to 150. This resin is solubilized with a volatile amine, ammonia, or NH$_4$OH in a solvent mixture of water, alkoxyethanols, alcohols, and alkyl ethers of diethylene glycol and combined with an aminoplast to produce a coating composition utilizable to coat surfaces that will contact a food or beverage, such as in metal packaging containers.

19 Claims, No Drawings

STORAGE STABLE WATER-DILUTABLE ACID ADDUCTED EPOXY BASED COATING FOR METAL FOOD CONTACT SURFACES

CROSS REFERENCE TO RELATED APPLICATIONS

This application is a continuation-in-part of copending application Ser. No. 50,722, filed June 21, 1979, which is a continuation-in-part of copending application Ser. No. 828,584, filed Aug. 29, 1977 both now abandoned.

BACKGROUND OF THE INVENTION

1. Field of the Invention

This invention is concerned with epoxy based resins water-solubilizable with ammonia or an amine and with water based coating compositions containing them.

2. Description of the Prior Art

It has been proposed to form water dilutable emulsions or dispersions containing epoxy resins for use as water based coatings. Such coatings have disadvantages, and it is highly desirable to provide water-soluble epoxy based coatings. Prior epoxy based coatings have poor shelf life due to the presence of oxirane groups and/or unreacted anhydride.

In copending application Ser. No. 736,984, filed Oct. 29, 1976 now U.S. Pat. No. 4,105,614, there is disclosed a resin in which the epoxy groups of a diglycidyl ether are capped with a bisphenol and the resultant material is reacted with an anhydride to provide water-solubilizable carboxyl groups. The resins of this invention utilizing a monocarboxylic acid, such as stearic acid, have advantages over the resins of Ser. No. 736,984.

1. Coatings made therefrom do not absorb n-heptyl p-hydroxybenzoate, a preservative used to stabilize unpasturized beer.

2. Coatings made therefrom have less effect on the flavor of beer on short term storage.

3. The coating formulations have higher solids content at application viscosity, which permits use of a single coating to attain coating weights necessary in standard applications. Application viscosity is generally 15–100 sec., preferably 25–70 sec., #2 Zahn cup.

4. The final coating formulation has better shelf life, as measured by viscosity change.

In U.S. Pat. No. 3,355,401 to Tanner, there is disclosed a resin prepared by condensing a polyglycidyl ether of a bisphenol with (a) a monobasic fatty acid, and (b) a fatty acid having at least two carboxyl groups, at least one of which is attached to a polymethylene group of at least 4 carbon atoms. The reaction involved in this patent is a condensation reaction involving the elimination of water of condensation. On the other hand, the resin of this invention is prepared by adduction of monocarboxylic acid to the oxirane ring, which does not involve formation of water of condensation. The effect of this adduction, using 1:1 to 1:1.2 equivalent ratio of diglycidyl ether to monocarboxlic acid, is to cap all the epoxy groups.

As is well known to those skilled in the art, reaction of a carboxylic acid with an epoxy resin can inolve three types of reaction: (1) addition esterification by adduction of carboxyl to oxirane with no water of condensation, (2) condensation esterification by reaction of carboxyl with hydroxyl groups on the epoxy resin, with elimination of water of condensation, and (3) esterification by reaction of oxirane with hydroxyl groups on the epoxy resin, leading to possible undesirable gel formation. In the absence of catalyst and at elevated temperature (200° C.), the reactions compete in a ratio of addition/condensation/etherfcation of about 2/1/1. In the presence of a tertiary amine catalyst, the only reaction is addition until all carboxyls are used up. Then, if some oxirane remains, etherification proceeds. See Lee and Neville "Handbook of Epoxy Resins", pages 5–18 through pages 5–20, McGraw Hill (1967).

Tanner operates at 185°–215° C. with no catalyst. Applicants use a tertiary amine catalyst and operate at about 150° C., thereby producing a resin different from Tanner's.

Insofar as is now known, a resin system of this type and coatings containing them have not been proposed.

SUMMARY OF THE INVENTION

This invention provides a water solubilizable resin that comprises an adduct of a monocarboxylic acid and a diglycidyl ether of a bisphenol, or of a monocarboxylic acid, a bisphenol, and a diglycidyl ether of a bisphenol, using an equivalent ratio of total monocarboxylic acid and bisphenol, if used, to diglycidyl ether between about 1:1 and about 1.2:1, further adducted with an anhydride in an amount sufficient to provide an acid number between about 35 and about 150.

It also provides a coating composition comprising such resin and an aminoplast, in a weight ratio between about 95:5 and about 70:30 solubilized with a volatile tertiary amine, ammonia, or ammonium hydroxide to a pH of about 7.0 to about 9.1 in at least one solvent of the group alcohols, alkoxyethanols, ketones, and alkyl ethers of diethylene glycol, each present in between about one weight percent and about 20 weight percent of the weight of the final composition, and diluted with water to a solids content between about 10 weight percent and about 25 weight percent.

It also provides substrates coated with such coating composition and metal packaging containers, interior coated with such coating composition and baked, containing a food or beverage.

DESCRIPTION OF SPECIFIC EMBODIMENTS

In general, the water-dilutable resins of this invention are prepared by adducting sufficient monocarboxylic acid or monocarboxylic acid and bisphenol to a diglycidyl ether of a bisphenol to react with all epoxy groups. The diglycidyl ether is usually heated to about 80°–90° C. in a suitable solvent which is not only a solvent for the reaction but can be a component of a binary azeotrope with water. Then, the monocarboxylic acid or monocarboxylic acid and bisphenol are added and the adduction is usually continued at about 150° C. for 2–3 hours until the epoxy value is 0.008 or less. This adduction reaction can be carried out in any order, i.e., monocarboxylic acid first followed by bisphenol, if used; or bisphenol, if used, first followed by monocarboxylic acid. It is preferred to react monocarboxylic acid, bisphenol, and diglycidyl ether of a bisphenol, simultaneously.

The adduction reaction of diglycidyl ether of bisphenol with a monocarboxylic acid is carried out in the presence of a tertiary amine catalyst. Typical catalysts are triethylamine, tri-n-butylamine, N,N-dimethylaniline, and N,N-benzylmethylamine.

Suitable solvents are ketones, ethers, and esters. Nonlimiting examples of suitable solvents are methyl ethyl ketone, methyl n-propyl ketone, methyl isobutyl ketone, disobutyl ether, and n-propyl acetate, n-butyl acetate, isobutyl acetate, n-propyl propionate, and ethyl butyrate. Ketones are especially preferred.

The reaction mixture should be refluxed to remove all water that may be present. Anhydrous conditions are necessary before the anhydride is added. After all water that may be present has been removed, an anhydride is added in an amount sufficient to provide an acid number between about 35 and about 150, preferably 40–90. Generally, the reaction is carried out at about 100°–120° C. for about 2–4 hours. The reaction of the anhydride is complete when the alcoholic acid number and the aqueous acid number are substantially the same, usually within two units of each other. In order to ensure good shelf life, the anhydride number must be below about six and preferably zero. The anhydride number is the difference between the alcoholic acid number and the aqueous acid number.

An alkoxy ethanol boiling at about 130° C. or higher and other solvents, such as alcohols, are added to reduce solids content to between about 60 and about 75 weight percent.

The epoxy resin utilized herein is a diglycidyl ether of a bisphenol, a class of compounds which are constituted by a pair of phenolic groups interlinked through an aliphatic bridge. While any of the bisphenols may be used, the compound 2,2-bis(p-hydroxy phenyl) propane, commonly known as bisphenol A, is more widely available in commerce and is preferred. The diglycidyl ethers of bisphenol A are readily available commercially. The epoxy resin, i.e., the diglycidyl ether of a bisphenol, will have an epoxy equivalent weight between about 180 and about 2500.

The aliphatic monocarboxylic acids utilizable herein have between 8 and 18 carbon atoms and a molecular weight between about 140 and about 290. Mixtures of monocarboxylic acids are contemplated. Non-limiting examples of the aliphatic monocarboxylic acids and mixtures thereof are octanoic acid, nonanoic acid, decanoic acid, undecanoic acid, lauric acid, tridecanoic acid, myristic acid, pentadecanoic acid, palmitic acid, heptadecanoic acid, stearic acid, oleic acid, linoleic acid, linolenic acid, ricinoleic acid, linseed fatty acids, safflower fatty acids, soya fatty acids, tall oil fatty acids, cottonseed fatty acids, castor oil fatty acids, dehydrated castor oil fatty acids, and tung oil fatty acids.

The bisphenol that is adducted with the epoxy resin can be any bisphenol as disclosed hereinabove. Preferably, bisphenol A is used. The equivalent ratio of total monocarboxylic acid and bisphenol, if used, to diglycidyl ether of a bisphenol will be between about 1:1 and about 1.2:1. The equivalent ratio of monocarboxylic acid to diglycidyl ether of a bisphenol will be between about 0.1:1 and about 1:1. The equivalent ratio of bisphenol to diglycidyl ether of a bisphenol will be between about 0.1:1 to about 0.9:1. The basic purpose of using a bisphenol is to upgrade the molecular weight (M.W.) of the diglycidyl ether of a bisphenol to ensure sufficient molecular weight of the final acidic resin. If the diglycidyl ether of a bisphenol has sufficiently high molecular weight, a bisphenol is not used. In general, the molecular weight of the final resin, as measured by Gel Permeation chromatography, will be between about 5,000 and about 25,000. Preferably the M.W. should be between about 8,000 and about 20,000. Most preferably, the M.W. should be between about 11,000 and about 13,000.

The preferred anhydride used in the resins of this invention is trimellitic anhydride. Other cyclic anhydrides which can be used include succinic anhydride, methyl succinic anhydride, tricarballylic anhydride, phthalic anhydride, hexahydrophthalic anhydride, and maleic anhydride.

The amount of anhydride used should be sufficient to obtain an acid number of 35 to 150, preferably between about 40 and about 90, in order to ensure water solubility when the resin is neutralized.

In order to obtain good shelf life of the coating composition, there should be no unreacted anhydride groups. The amount of anhydride to be used can be readily calculated from the hydroxyl number of the monocarboxylic acid and bisphenol adducted epoxy.

In forming a coating composition containing the acidic resin, the resin is neutralized with a tertiary amine, ammonia, or ammonium hydroxide to a pH of about 7.0 to about 9.1. Typical amines utilizable include triethylamine, tripropyl amine, dimethylethanol amine, diethylethanol amine, dimethylethyl amine and methyldiethyl amine.

The material used to thermoset the coating is a conventional aminoplast cross-linking agent. Such agents as well known in the art. There can be used any of the thermosetting alkylated aminoplast resins, such as the urea-aldehyde resins, the melamine-aldehyde resins, the dicyandiamide-aldehyde resins and other aminoplast-aldehyde resins such as those triazine resins produced by the reaction of an aldehyde with formoguanamine, ammeline, 2-chloro-4,6-diamino-1,3,5-triazine, 2-phenyl-p-oxy-4,6-diamino-1,3,5-triazine, 6-methyl-2,4-diamino-1,3,5-triazine; 2,4,6-trihydrazine; 1,3,5-triazine, and 2,4,6-triethyl-triamino-1,3,5-triazine. The mono, di-, or triaralkyl or mono-, di-, or triaryl melamines, for instance 2,4,6-triphenyltriamino-1,3,5-triazine are preferred. As aldehydes used to react with the amino compound to form the resinous material, one may use such aldehydes as formaldehyde, acetaldehyde crotonic aldehyde, acrolein, or compounds which engender aldehydes, such as hexamethylene-tetramine, paraldehyde, paraformaldehyde, and the like. The preferred amnioplast is hexamethoxymethylmelamine. The weight ratio of acidic resin to aminoplast will be between about 95:5 and about 70:30.

The solvent system used in the coating composition will include alcohols, alkoxy ethanols, ketones and alkyl ethers of diethylene glycol. Suitable alcohols are those having between about 2 and about 8 carbon atoms and having a boiling point up to about 180° C. Non-limiting examples of utilizable alcohols include special denatured ethanols (Formula 1), proparno, butanol, isobutanol, t-butanol, pentanol, hexanol, 2-methylpentanol, 3-methylpentanol, heptanol, isoheptanol, octanol, isooctanol and 2-ethylhexanol.

The alkoxy ethanols utilizable are those having between 1 and 6 carbon atoms in the alkoxy group. Non-limiting examples include methoxy ethanol, ethoxy ethanol, butoxy ethanol and hexoxy ethanol. Also utilizable are propoxy propanol and butoxy propanol.

The ketones utilizable are aliphatic ketones containing between 3 and 8 carbon atoms. Non-limiting examples of utilizable ketones are acetone, diethyl ketone, methylethyl ketone, methylpropyl ketone, methyl isobutyl ketone, methylamyl ketone, methylhexyl ketone, ethylpropyl ketone, ethylbutyl ketone, ethylamyl ketone and methoxy acetone.

The utilizable alkyl ethers of diethylene glycol will contain between 1 and 4 carbon atoms in the alkyl group. Non-limiting examples include the monomethyl ether of diethylene glycol, the monoethyl ether of diethylene glycol and the monobutyl ether of diethylene glycol.

In general, alkylethanols, ketones and alkyl ethers of diethylene glycol are primarily solvents for resin and amnioplast. Lower alcohols, such as ethanol, t-butanol, also assist in wetting surface being coated. Higher alcohols, such as isooctanol, also serve as defoamants. In controlling viscosity of the final coating composition, higher boiling solvents, such as hexoxyethanol, tend to increase viscosity and lower boiling solvents, such as butoxyethanol and methyl ethyl ketone, tend to decrease viscosity.

Although mixtures of organic solvents are highly preferred, satisfactory coating compositions can be prepared using a single methoxy ethanol, ketone or alkyl ether of diethylene glycol.

In the finished coating composition, the solids content (resin and aminoplast) will be between about 10 and about 25 weight percent, preferably about 20-23 weight percent. The volatile system (including amine, ammonia, or ammonium hydroxide) will be between about 90 weight percent and about 75 weight percent of the finished coating composition, preferably about 77-80 weight percent. About 65 to 90 weight percent of the volatile system will be water and the balance (35 to 10 weight percent) will be organic volatile solvents, including amine, ammonia, or ammonium hydroxide. Preferably, the ratio of water to organic volatiles will be about 7:30 to 80:20 in the volatile system. Each component of the solvent system will be present in between about one weight percent and about 20 weight percent of the weight of the final composition. A typical and preferred solvent system is defined in the working examples.

In the following illustrative examples, all parts are parts by weight, unless otherwise indicated.

EXAMPLE 1

Into a reaction kettle, there was charged 55.4 parts of an 80 weight percent solids solution in methyl ethyl ketone (MEK) of a diglycidyl ether of bisphenol A having an epoxy equivalent weight of 450-550 and an epoxy value of 0.22, based on solids. The solution was heated to 88° C. (190° F.) and there were added 10.02 parts bisphenol A, 5.84 parts of a mixture of 70 weight percent stearic acid and 30 weight percent palmitic acid, and 0.17 part tri-n-butylamine (catalyst). The reaction mixture was heated to 149° C. (300° F.), removing MEK distillate as necessary. At 149° C., the reaction mixture was held at total reflux for 2 hours and sampled for solids and epoxy value. Reflux was maintained until epoxy value was 0.008 maximum. Then, the reaction was cooled to 115° C. (240° F.), adjusting solids to 92±0.5 weight percent with MEK distillate. At 115° C., there were added 5.95 parts trimellitic anhydride and the reaction was heated at 118° C. (245° F.) for 2 hours. Then, the reaction mixture was sampled for anhydride number which was to be 6.0 maximum. After 2½ hours at 118° C., the reaction was sampled for anhydride number and 15.06 parts n-butanol and 7.52 parts butoxy ethanol were added and held until the mixture was uniform. Final values for acid number, anhydride number, weight percent solids, and molecular weight are set forth in Table I.

EXAMPLES 2 THROUGH 9

A series of runs were carried out in a manner similar to Example 1, with the following exceptions: Example 2 is a laboratory repeat of Example 1; Example 3 is a pilot plant run of Example 1; Example 4 uses excess stearic acid; Example 5 uses less stearic acid; in Example 6, the stearic acid was reacted first, followed by bisphenol A; in Example 7, more stearic acid was used and less bisphenol A; Example 8 was the same as Example 2, except that the final solvent was butyl ether of diethylene glycol instead of the 2:1 weight ratio mixture of butanol and butoxy ethanol used in the other examples; and in Example 9, a greater amount of trimellitic anhydride was used. Pertinent data and final values for these examples are set forth in Table I, along with Example 1.

TABLE I

| Example | 1 | 2 | 3 | 4 | 5 | 6 | 7 | 8 | 9 |
|---|---|---|---|---|---|---|---|---|---|
| Reactants, Equivalents | | | | | | | | | |
| Epon 1001[1] | 1.00 | 1.00 | 1.00 | 1.00 | 1.00 | 1.00 | 1.00 | 1.00 | 1.00 |
| Bisphenol A | 0.90 | 0.90 | 0.90 | 0.90 | 0.90 | 0.90 | 0.84 | 0.90 | 0.90 |
| Stearic Acid[2] | 0.21 | 0.21 | 0.21 | 0.27 | 0.17 | 0.21 | 0.27 | 0.22 | 0.21 |
| TMA[3] | 0.30 | 0.30 | 0.30 | 0.33 | 0.31 | 0.30 | 0.32 | 0.32 | 0.42 |
| Final Values | | | | | | | | | |
| Wt. % Solids | 70.0 | 70.2 | 70.1 | 70.6 | 71.2 | 70.7 | 69.8 | 70.1 | 70.3 |
| Acid No. | 54.9 | 55.4 | 54.0 | 53.6 | 53.8 | 52.1 | 52.5 | 53.0 | 72.5 |
| Anhydride No. | 6.0 | 3.5 | 5.9 | 2.0 | 4.7 | 1.0 | 2.6 | 3.0 | 4.7 |
| Mol. Wt. | 11,443 | 12,215 | 13,368 | 8,975 | 17,945 | 15,563 | 11,471 | 12,778 | 11,298 |

[1]Diglycidyl ether of bisphenol A, Epoxy Value = 0.22, 80 wt. % solids in MEK
[2]Mixture 70 wt. % stearic acid/30 wt. % palmitic acid
[3]Trimellitic anhydride

EXAMPLES 10 AND 11

Using the general procedure of Example 1, resins of this invention can be prepared using relatively low molecular weight diglycidyl ethers of bisphenol A. Example 10 is like Example 1 except for the use of a different epoxy resin. In Example 11, the diglycidyl ether of bisphenol A is upgraded in molecular weight with bisphenol A and then reacted with stearic acid.

The recipes, in parts, for these examples are set forth in Table II.

TABLE II

| | Example 10 | Example 11 |
|---|---|---|
| Epoxy resin X[1] | 34.42 | — |
| Epoxy resin Y[2] | — | 33.88 |
| MEK | 5.54 | 5.35 |
| Bisphenol A | 18.50 | 13.84 |
| Stearic acid[3] | 10.78 | 15.98 |
| Tri-n-butylamine | 0.31 | 0.19 |
| Trimellitic anhydride | 6.30 | 6.30 |
| Butoxy ethanol | 8.05 | 12.23 |
| n-Butanol | 16.10 | — |

TABLE II-continued

| | Example 10 | Example 11 |
|---|---|---|
| t-Butanol | — | 12.23 |

(1)Diglycidyl ether of bisphenol A. Epoxy equivalent is 185-192. Epoxy value is 0.52.
(2)Diglycidyl ether of bisphenol A. Epoxy equivalent is 193-203.
(3)Mixture 70 wt. % stearic acid/30 wt. % palmitic acid.

EXAMPLE 12

This example demonstrates the preparation of a resin in which the epoxy is of sufficiently high molecular weight that no bisphenol A, but only stearic acid, was used. In a reaction kettle, were charged 47.72 parts of diglycidyl ether of bisphenol A having an epoxy equivalent weight of 850 and 5.35 parts of methyl ethyl ketone (MEK). The mixture was heated to about 88° C. to dissolve the resin (about 55 min.). Then, 15.98 parts stearic acid and 0.19 part tri-n-butylamine were added and the reaction mixture was heated to 150° C., collecting about 146 g. MEK distillate, and held at 150° C. for 2 hours. After 1½ hours, a sample of the reaction mixture showed an epoxy value of 0.004. The MEK distillate was added back to the reaction mixture and 6.30 parts trimellitic anhydride were added. The reaction mixture was heated to reflux at about 116° C., removing 11-12 g. MEK distillate, and held at reflux for 2½ hours. The mixture was sampled and then reduced with 12.23 parts butoxy ethanol and 12.23 parts t-butanol. The final values of the resin solution were:

Wt. % solids: 68.8
Acid No.: 65.8
Anhydride No.: 3.6
Mol. Wt.: 7,000

The following Examples 13 through 15 illustrate the preparation of coating compositions using the resins of this invention.

EXAMPLE 13

A mixture of 28.93 parts of the product described in Example 1, 2.25 parts hexamethoxymethylmelamine, 3.37 parts n-butanol, 0.30 part hexoxy ethanol, and 0.37 part butyl ether of diethylene glycol was stirred until uniform, while not permitting the temperature to exceed 54° C. Then, there were added 1.29 parts denatured alcohol (Synasol), which contains denaturants in the proportions of 100 gallons of special denatured alcohol Formula 1, 1 gallon of methyl isobutyl ketone, 1 gallon ethyl acetate, and 1 gallon aviation gasoline. This was stirred until uniform. There was added a premixed mixture of 1.30 parts aqueous ammonia (26° Baumé) and 2.19 parts deionized water. This was stirred until uniform and then diluted with 60.00 parts deionized water.

The final coating composition had a solids content of 22.63 weight percent, containing 90.06 weight percent resin of Example 1 and 9.94 weight percent hexamethoxymethylmelamine. The pH was 8.5-9.0.

EXAMPLE 14 AND 15

In an alternative mixing procedure, n-butanol, butoxy ethanol, and hexamethoxymethylmelamine were charged and agitation was begun. The product described in Example 1 was added and stirred until uniform, not permitting the temperature to exceed 49° C. A premixed mixture of aqueous ammonia 26° Baumé) and deionized water was added and stirred until uniform. Finally, the composition was diluted with deionized water to produce the final coating composition. The amounts of components, in parts, in each Example 14 and 15 and pertinent data on the final coating compositions are set forth in Table III.

TABLE III

| | Example 14 | Example 15 |
|---|---|---|
| n-Butanol | 0.86 | 2.99 |
| Butoxy ethanol | 3.26 | 4.36 |
| Hexamethoxymethylmelamine | 2.35 | 2.33 |
| Example 1 product | 30.03 | 29.73 |
| Aqueous ammonia | 1.25 | 1.36 |
| Deionized water | 2.00 | 1.98 |
| Deionized water | 60.25 | 57.25 |
| Solids, wt. % | 23.5 | 23.27 |
| pH | 8.5-9.0 | 8.5-9.0 |
| Resin/aminoplast, wt. % | 90/10 | 90/10 |

The coating composition of this invention is primarily useful for coating aluminum, tin plated steel, pretreated metals, steel, and metals coated with the same or different resin composition (i.e., a second coat). The coating composition can be used, however, for coating other substrates such as wood, paper and leather. The most preferred and useful use of the coating composition is for interior coating of metal containers that will come in contact with food or beverages. Coating can be done by any coating procedure well known to those skilled in the art, including direct rollcoating, reverse rollcoating, electrodeposition, spraying, flow coating and the like. The preferred method, however, in coating the interior of metal containers is by spraying. After coating the substrate, the coating is baked for about 5 seconds to about 5 minutes at between about 250° F. and about 600° F. A typical bake is for about 2 minutes at about 400° F.

The coating compositions of Examples 13, 14 and 15 were tested for adhesion, pasteurized adhesion and blush. The adhesion test is carried out by cross-hatching a coated area with individual score lines approximately 1/16 inch apart. The Scotch tape is firmly applied to the cross-hatched area and removed with a quick snap. The amount of coating remaining on the panel is viewed visually and rated on a 0-10 scale (10=perfect adhesion). Pasteurization is carried out by immersing the coated panels in water at 145° F. for 30 minutes. Then the panels are wiped dry with absorbent towels and the adhesion test is carried out as above described. The amount of blush is rated on the pasteurized panel using a scale of 0 to 10 in which 0 is very severe blush and 10 is no blush.

EXAMPLE 16

Treated aluminum test panels were coated with the coating compositions of Examples 13, 14 and 15 with a bar coater to a film weight of 2.5 to 3.0 milligrams per square inch. These test panels showed an adhesion rating of 10 in the adhesion test. In the pasteurization test, the panels gave a rating of 10 adhesion and 10 on blush.

The effect of a coating on the flavor of a packaged product is determined in a Flavor Difference Evaluation. Bottles of commercial beer are chilled to about 40°-45° F. and uncapped. Sheets of aluminum foil (1 mil) are bar coated on both sides with the coating being evaluated and baked. Then, a sheet of foil is rolled lightly and inserted into each bottle of beer and the bottle is recapped with a new cap.

For comparison, additional bottles of the same beer are provided with rolls of aluminum foil that have been coated on both sides with an accepted commercial coating for interior coating (solvent-based epoxy coating) and baked. The test coating and the control coating were baked for 30 seconds at 400° F. metal temperature.

After storage for 3 days at 100° F., the bottles of beer are again chilled and taste rated by 9 experienced tasters comparing the test coatings vs. the control. The arithmetic average of the ratings is calculated ($\bar{x}$). Then, all rating values outside $\bar{x}\pm2$ are excluded and another average is calculated as the quality rating (QR). The following rating scale was used on a basis of 1-9.

1 = no flavor difference
1.0-1.5 = excellent flavor
1.5-2.0 = very good flavor
2.0-2.5 = good flavor
2.5-3.0 = acceptable flavor
>3.0 = not acceptable In unpasteurized beer, n-heptyl p-hydroxybenzoate is used in an amount of 12 ppm. to inhibit microbial growth. It is highly desirable that a coating used to coat the interior of metal beer containers does not absorb an appreciable amount of the n-heptyl p-hydroxybenzoate (sold under the registered trademark "Staypro").

This property is tested using a simulated beer, an aqueous solution of 8 volume percent ethanol and 12 ppm. "Staypro". Metal beer containers are interior coated with the coating composition under test and baked in the usual baking cycle, e.g., 2 min. at 400° F. Then, the containers are filled with simulated beer and stored at room temperature for one week. At the end of the week, the simulated beer is analyzed to determine the amount of heptyl p-hydroxybenzoate remaining. This is done by measuring light transmission on a spectrophotometer at a wavelength of 255 millimicrons, in comparison with the original.

EXAMPLE 17, 18 and 19

Using resins as described in Examples 1 and 9 herein and in Example 1 of Ser. No. 736,984, coating formulations were prepared by the procedure of Example 14. Each formulation contained 10 weight percent (on solids basis) hexamethoxymethylmelamine and the volatile system had a volume percent ratio of water/organic solids of 80/20. The formulations were used in testing for beer flavor rating and for resistance to absorption of n-heptyl p-hydroxybenzoate. Pertinent data and test results are set forth in Table IV.

TABLE IV

| Example | Resin Description Example | Source | Beer Flavor QR | Staypro ppm. Remaining |
|---|---|---|---|---|
| 17 | 1 | Herein | 1.2 | 11.9 |
| 18 | 9 | " | 1.1 | 11.8 |
| 19 | 1 | S.N. 736,984 | 1.3 | 10.5 |

Storage stability (shelf life) of a coating composition is measured by the change in viscosity. A significant increase in viscosity is not desirable. A coating composition as described in Example 17 and, for comparison, a coating composition as described in Example 19 were placed in lined coating containers and stored at 80° F. Periodically, the compositions were tested for viscosity at 80° F. using #2 Zahn cup. The results are set forth in Table V.

TABLE V

| | Viscosity, seconds | |
|---|---|---|
| Time, weeks | Example 17 | Example 19 |
| Initial | 25-40 | 40-50 |
| 8 | 20-30 | 70-80 |
| 14 | 20-30 | — |
| 16 | — | >90 |

As is discussed hereinbefore, in U.S. Pat. No. 3,355,401 (Tanner), there is described a resin prepared by a condensation reaction between an epoxy resin and a mixture of mono- and dibasic acids, by reacting under elevated temperatures (about 200° C.) without a catalyst. The present application teaches an addition reaction between an epoxy resin and a monobasic acid by reacting under mild conditions (about 149° C.) in the presence of a tertiary amine catalyst. This is followed by an adduction of an anhydride to the backbone of the ester formed in the first stage.

In the following examples, conditions described by Tanner, and variations thereof, were applied to the resins described in Examples 1 and 12 described hereinbefore. In summary, in the case of Example 1, gels were produced with all variations—high temperature, with catalyst; high temperature, without catalyst; and low temperature, without catalyst. In the case of Example 12, gels were produced under the temperature conditions of Tanner-high temperature, no catalyst and high temperature, with catalyst. Example 3 of Tanner was reproduced, but the final product was cloudy and subsequently separated when dispersed in water.

EXAMPLE 20

Example 1 was repeated using a two stage reaction. The first stage was carried out at 149° C., using tri-n-butylamine catalyst, reacting Epon 1001, bisphenol A, and a mixture of 70 weight percent stearic acid and 30 weight percent palmitic acid. After 2 hours reaction, the first stage reaction product had an epoxy value of 0.008 and an acid number of zero.

The second stage was carried out at 120° C. between first stage reaction product and trimellitic anhydride. After about 2 hours, the anhydride number was zero and the aqueous acid number was 48.0. After dilution, the final solids was 71.9% and aqueous acid number was 47.2.

A dispersion of this resin was prepared as described in Example 13. This dispersion was satisfactory and had 21% solids and a pH of 9.15.

EXAMPLE 20(a)

The first variation of Example 20 was to react the first and second stages at 195° C. using the tri-n-butylamine catalyst. Almost all the MEK solvent had to be removed, in order to maintain the reaction temperature. The following first stage values were obtained:

| | Epoxy Value | AN |
|---|---|---|
| 2 hours at 195° C. | 0.014 | 0 |
| 2' 40" at 195° C. | 0.012 | — |
| 3' 20" at 195° C. | 0.011 | — |
| 4 hours at 195° C. | 0.010 | — |

The epoxy value did not drop to the desired 0.008 even after an additional 2 hours reaction time. In the second stage, the resin gelled within 23 minutes after the trimellitic anhydride addition.

EXAMPLE 20(b)

The second variation of Example 20 was to react the first and second stages at 195° C. without a catalyst, i.e., under conditions of the Tanner patent. The following first stage values were obtained:

|  | Epoxy Value | AN |
| --- | --- | --- |
| 2 hours at 195° C. | 0.065 | 1 |
| 3 hours at 195° C. | 0.046 | — |
| 4 hours at 195° C. | 0.035 | — |

Because of the high epoxy content, this resin gelled within one minute after the addition of trimellitic anhydride in the second stage.

EXAMPLE 20(c)

The third variation of Example 20 was to react at 150° C. but without a catalyst. This virtually prevented a reaction from occurring. The following first stage values were obtained:

|  | Epoxy Value | AN |
| --- | --- | --- |
| 2 hours at 150° C. | 0.139 | 12.6 |
| 3 hours at 150° C. | 0.125 | 11.3 |
| 4 hours at 150° C. | 0.115 | 7.11 |

This resin gelled 1 hour and 30 minutes after the addition of the trimellitic anhydride in the second stage.

EXAMPLES 21 (a) and (b)

Two variations were tried on Example 12, high temperature (195° C.) (a) with a catalyst, and (b) without a catalyst. Nothing unusual occurred during the first stage of either reaction. All the acid was consumed within 3 hours and the epoxy value was in the desired range.

The resin without catalyst gelled 40 minutes after the addition of trimellitic anhydride in the second stage.

The resin with catalyst refluxed heavily, forcing the reaction temperature down to 165° C. Ten minutes after water was removed to force the temperature back up, the resin gelled (1 hour and 35 minutes after the addition of the trimellitic anhydride in the second stage).

EXAMPLE 22

Example 3 of the Tanner patent was duplicated without problems. Solids content was 76.4% and the acid number was 135. This resin was cut to 70% solid with 2/1 n-butanol/butoxy ethanol and had an acid number of 115.

The resin was dispersed in the manner described in Example 13. The dispersion was a mixture of turbid water, solid floating foam, and precipitate.

It can be concluded that variations forcing the reaction away from the epoxy-carboxyl addition reaction, by applying conditions other than prescribed in this specification, will produce gels.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A water-solubilizable resin prepared in the absence of dicarboxylic acid consisting essentially of (A) an adduct of a monocarboxylic acid having between 8 and 18 carbon atoms and a diglycidyl ether of a bisphenol, or (B) of a monocarboxylic acid having between 8 and 18 carbon atoms, a bisphenol, and a diglycidyl ether of a bisphenol, in an equivalent ratio of total monocarboxylic acid and bisphenol, to diglycidyl ether between about 1:1 and about 1.2:1; (A) or (B) being further adducted with an anhydride selected from the group consisting of trimellitic anhydride, succinic anhydride, methyl succinic anhydride, tricarballylic anhydride, phthalic anhydride, hexahydrophthalic anhydride, and maleic anhydride, in an amount sufficient to provide an acid number between about 35 and about 150.

2. The resin of claim 1, wherein said bisphenol is bisphenol A.

3. The resin of claim 2, wherein said anhydride is trimellitic anhydride and said acid number is between about 40 and about 90.

4. The resin of claim 3, wherein said diglycidyl ether is the diglycidyl ether of bisphenol A having an epoxy equivalent weight of 450–550, said monocarboxylic acid is a mixture of 70 weight percent stearic acid and 30 weight percent palmitic acid, and the equivalent ratio of said monocarboxylic acid, and bisphenol A to said diglycidyl ether is between about 1:1 and about 1.2:1.

5. The resin of claim 3, wherein said diglycidyl ether is the diglycidyl ether of bisphenol A having an epoxy equivalent weight of about 850, said monocarboxylic acid is stearic acid, and the equivalent ratio of stearic acid to said diglycidyl ether is about 1:1.

6. The resin of claim 4 dissolved in a mixture of a $C_1$–$C_4$ alkoxyethanol and a $C_2$–$C_4$ alcohol to a solids content between about 60 and about 75 weight percent.

7. The resin of claim 6 wherein said alkoxyethanol is butoxyethanol and said alcohol is butanol.

8. The resin of claim 5 dissolved in a mixture of butoxyethanol and butanol.

9. A coating composition comprising the resin of claim 1 and an aminoplast, in a weight ratio between about 95:5 and about 70:30 solubilized with a volatile tertiary amine, ammonia, or ammonium hydroxide to a pH of about 7.0 to about 9.1 in at least one solvent of the group of alcohols, having between about 2 and about 8 carbon atoms, alkoxyethanols, ketones, and alkyl ethers of diethylene glycol, each present in between about one weight percent and about 20 weight percent of the weight of the final composition, and diluted with water to a solids content between about 10 weight percent and about 25 weight percent.

10. The coating composition of claim 9, wherein said resin is the resin of claim 6.

11. The coating composition of claim 9, wherein said resin is the resin of claim 7, said aminoplast is hexamethoxymethylmelamine, the solvent mixture is a mixture of butoxyethanol, butanol, methyl ethyl ketone, butyl ether of diethylene glycol, hexoxyethanol, and denatured alcohol, said volatile system contains about 80 weight percent water and about 20 weight percent organic solvents, and said solids content is about 20–23 weight percent.

12. A substrate coated with the coating composition of claim 9 and baked.

13. A metal substrate coated with the coating composition of claim 9 and baked.

14. A metal substrate coated with the coating composition of claim 10 and baked.

15. A metal substrate coated with the coating composition of claim 11 and baked.

16. A metal food packaging container interior coated with the coating composition of claim 9 and baked, containing food or beverage.

17. A metal food packaging container interior coated with the coating composition of claim 10 and baked, containing food or beverage.

18. A metal food packaging container interior coated with the coating composition of claim 11 and baked, containing food or beverage.

19. The container of claim 17, wherein said metal is aluminum.

* * * * *